United States Patent
Suto et al.

(10) Patent No.: US 11,303,537 B2
(45) Date of Patent: Apr. 12, 2022

(54) MANAGEMENT DEVICE AND MANAGEMENT METHOD

(71) Applicant: Nippon Telegraph and Telephone Corporation, Tokyo (JP)

(72) Inventors: Yuichi Suto, Tokyo (JP); Aiko Oi, Tokyo (JP); Motomu Nakajima, Tokyo (JP); Yuji Soejima, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/734,404

(22) PCT Filed: May 29, 2019

(86) PCT No.: PCT/JP2019/021200
§ 371 (c)(1),
(2) Date: Dec. 2, 2020

(87) PCT Pub. No.: WO2019/235307
PCT Pub. Date: Dec. 12, 2019

(65) Prior Publication Data
US 2021/0168048 A1    Jun. 3, 2021

(30) Foreign Application Priority Data
Jun. 4, 2018 (JP) .............................. JP2018-106824

(51) Int. Cl.
*G06F 15/173* (2006.01)
*H04L 41/50* (2022.01)
*H04L 67/10* (2022.01)

(52) U.S. Cl.
CPC .............. *H04L 41/50* (2013.01); *H04L 67/10* (2013.01)

(58) Field of Classification Search
CPC ................................ H04L 41/50; H04L 67/10
USPC .................................................. 709/223, 224
See application file for complete search history.

(56) References Cited

U.S. PATENT DOCUMENTS

| 10,530,712 B2* | 1/2020 | Merchant | .............. H04L 45/304 |
| 2015/0139036 A1* | 5/2015 | Liu | ........................ H04L 69/322 370/255 |
| 2019/0028325 A1* | 1/2019 | Ma | ........................ H04L 41/046 |

(Continued)

FOREIGN PATENT DOCUMENTS

JP    2017-143452    8/2017

*Primary Examiner* — Liang Che A Wang
(74) *Attorney, Agent, or Firm* — Fish & Richardson P.C.

(57) ABSTRACT

A management apparatus is configured to manage a network service (NS) constructed on a network (NW) including a core NW configured to serve as a virtualization area and an access NW configured to serve as a non-virtualization area includes an E2EO configured to control the NS, an SVRO configured to control server-type apparatuses located on the NW, and a NWRO configured to control NW-type apparatuses located on the NW. The E2EO includes a single data center (DC) determination unit configured to determine whether a group of apparatuses used for providing the NS is located in a single DC. The group of apparatuses is designated by an order acquired from an upper level apparatus U. Among the NW-type apparatuses, ToRs located in the DC are controlled by the SVRO, instead of by the NWRO, when it is determined that the group of apparatuses is located in the single DC.

8 Claims, 2 Drawing Sheets

(56) References Cited

U.S. PATENT DOCUMENTS

2019/0245782 A1* 8/2019 Jin .................. H04L 49/252
2021/0029029 A1* 1/2021 Mehmedagic ...... H04L 63/0218

* cited by examiner

MANAGEMENT DEVICE AND MANAGEMENT METHOD

CROSS-REFERENCE TO RELATED APPLICATIONS

This application is a National Stage application under 35 U.S.C. § 371 of International Application No. PCT/JP2019/021200, having an International Filing Date of May 29, 2019, which claims priority to Japanese Application Serial No. 2018-106824, filed on Jun. 4, 2018. The disclosure of the prior application is considered part of the disclosure of this application, and is incorporated in its entirety into this application.

TECHNICAL FIELD

The present invention relates to a management apparatus and a management method. Herein, DC is used as a term representing a data center, NW is used as a term representing a network, and NS is used as a term representing a network service.

BACKGROUND ART

Patent Literature 1 (PTL1) discloses "a management apparatus that manages a network service (NS) constructed on a network (NW) including a core NW serving as a virtualization area and an access NW serving as a non-virtualization area. The management apparatus includes a service management unit that manages the NS, a server-type apparatus management unit that manages server-type apparatuses located on the NW, and a NW-type apparatus management unit that manages NW-type apparatuses located on the NW. The service management unit includes a request receiving unit that acquires, from the outside, a NS generation request including input parameters required for designating the server-type apparatuses and the NW-type apparatuses used for providing the NS, a catalog management unit that manages a catalog serving as a template of the NS, a resource arbitration unit that arbitrates resources of the server-type apparatuses and resources of the NW-type apparatuses, a workflow unit that generates, in a case where the catalog is selected, a slice for achieving the NS by generating the resources of the designated server-type apparatuses and the resources of the designated NW-type apparatuses according to the input parameters, and a NS lifecycle management unit that manages a lifecycle of the NS."

CITATION LIST

Patent Literature

Patent Literature 1: JP 2017-143452 A (Claim 1)

SUMMARY OF THE INVENTION

Technical Problem

The NS includes a service provided by a group of apparatuses that are located in an identical DC (hereinafter, may be referred to as intra-DC apparatuses). Such a service is completed within a single DC without utilizing a wide area network (WAN) that connects between DCs, and basically the service can be sufficiently controlled by the SVRO. Thus, the service that is completed within a single DC basically requires no control by the NWRO involving multiple DCs.

However, according to PTL1, although the intra-DC apparatuses are mostly classified as the server-type apparatuses, some apparatuses are classified as the NW-type apparatuses. Thus, the service that is completed within a single DC cannot be completed with the control by the SVRO, and the control by the NWRO is executed. As a result, there is a further problem in that the service that is completed within a single DC is forced to go through long and complex orchestrator control, resulting in a decrease in service responsiveness. Note that examples of the intra-DC apparatus classified as the server-type apparatus include a server, and examples of the intra-DC apparatus classified as the NW-type apparatus include a top of rack (ToR) for connecting a plurality of servers. If the SVRO controls the ToR, it is necessary to address a conflict with the control by the NWRO on the ToR. As a result, there is a further problem in that the service that is completed within a single DC is forced to go through long and complex orchestrator control, resulting in a decrease in service responsiveness.

While there are various types of apparatuses located on the NW, the technique in PTL1 does not clearly define which of the SVRO and the NWRO controls a certain type of apparatus. As a result, there is a further problem in that the control by the SVRO and the control by the NWRO may conflict for a certain type of apparatus, resulting in a decrease in service responsiveness.

Thus, in view of the above, an object of the present invention is to improve the service responsiveness of a service provided by an intra-DC apparatus.

Means for Solving the Problem

To solve the problem described above, the invention according to a first aspect is a management apparatus configured to manage a network service (NS) constructed on a network (NW) including a core NW configured to serve as a virtualization area and an access NW configured to serve as a non-virtualization area, and includes: a first orchestrator configured to control the NS; a second orchestrator configured to control server-type apparatuses located on the NW; and a third orchestrator configured to control NW-type apparatuses located on the NW, wherein the first orchestrator includes a single data center (DC) determination unit configured to determine whether a group of apparatuses used for providing the NS is located in a single DC, the group of apparatuses being designated by a first order acquired from an external apparatus, and, among the NW-type apparatuses, an intra-DC NW-type apparatus located in the DC is controlled by the second orchestrator, instead of by the third orchestrator, when it is determined that the group of apparatuses is located in a single DC.

The invention according to an eighth aspect is a management method for a management apparatus configured to manage a NS constructed on a NW including a core NW configured to serve as a virtualization area and an access NW configured to serve as a non-virtualization area, the management apparatus including a first orchestrator configured to control the NS, a second orchestrator configured to control server-type apparatuses located on the NW, and a third orchestrator configured to control NW-type apparatuses located on the NW, the method including: determining, by the first orchestrator, whether a group of apparatuses used for providing the NS is located in a single DC, the group of apparatuses being designated by a first order acquired from an external apparatus, and controlling, by the second orchestrator, instead of by the third orchestrator, an intra-DC NW-type apparatus located in the DC, among the NW-type apparatuses, when it is determined that the group of apparatuses is located in the single DC.

With the inventions according to the first and eighth aspects, all of the group of apparatuses located in the single DC can be controlled from the second orchestrator, not from the third orchestrator. This can avoid conflict between the control by the second orchestrator and the control by the third orchestrator on the intra-DC NW-type apparatus. Thus, the service responsiveness of the service provided by the intra-DC apparatus can be improved.

The invention according to a second aspect is the management apparatus according to the first aspect, wherein the first order includes intra-DC NW-type apparatus control information for controlling the intra-DC NW-type apparatus, and when it is determined that the group of apparatuses is located in the single DC, the first orchestrator makes the intra-DC NW-type apparatus control information included in a second order to be output to the second orchestrator.

With the invention according to the second aspect, the second orchestrator can control the intra-DC NW-type apparatus.

The invention according to a third aspect is the management apparatus according to the first or second aspect, wherein the first orchestrator exclusively controls the intra-DC NW-type apparatus.

With the invention according to the third aspect, the intra-DC NW-type apparatus can be prevented from being controlled by the second orchestrator and the third orchestrator simultaneously.

The invention according to a fourth aspect is the management apparatus according to the first to third aspects, further including a control method switching unit configured to select and switch to one of a plurality of types of control methods for controlling the group of apparatuses designated by the first order, the control method switching unit being provided in the first orchestrator.

With the invention according to the fourth aspect, for example, whether to use the control method according to the present invention or an existing control method as the control method for the server-type apparatuses and the NW-type apparatuses can be easily selected.

The invention according to a fifth aspect is the management apparatus according to any one of the first to fourth aspects, wherein the intra-DC NW-type apparatus is a physical switch connected to the server-type apparatuses located in the single DC.

With the invention according to the fifth aspect, conflict between the control by the second orchestrator and the control by the third orchestrator on the physical switch can be avoided.

The invention according to a sixth aspect is the management apparatus according to the fifth aspect, wherein the physical switch is a top of rack (ToR).

With the invention according to the sixth aspect, conflict between the control by the second orchestrator and the control by the third orchestrator on the ToR can be avoided.

The invention according to a seventh aspect is the management apparatus according to the sixth aspect, wherein control on the ToR is unique to each vendor of the ToR.

With the invention according to the seventh aspect, control failures due to the difference between ToR specifications of the respective vendors in the ToR control by the second orchestrator on multiple ToRs located in the DC can be avoided.

Effects of the Invention

With the present invention, the service responsiveness of a service provided by an intra-DC apparatus can be improved.

DESCRIPTION OF EMBODIMENTS

A mode for implementing the present invention (embodiment) will be described below with reference to the drawings.

A management apparatus M according to the present embodiment manages a core NW serving as a virtualization area and an access NW serving as a non-virtualization area. Specifically, the management apparatus M monitors devices located on the core NW and devices located on the access NW by collecting various information from these devices. An NW configuration is created by the devices located on the core NW and the devices located on the access NW.

The management apparatus M also manages a network service (NS) constructed on the NW including the core NW and the access NW. The NS can implement end to end (E2E) management between end points that are a NS use side (user) and a service provider (internet service provider (ISP), for example), via devices on an access NW and a core NW held on a NS providing side (a communication carrier, for example).

Figure 1:
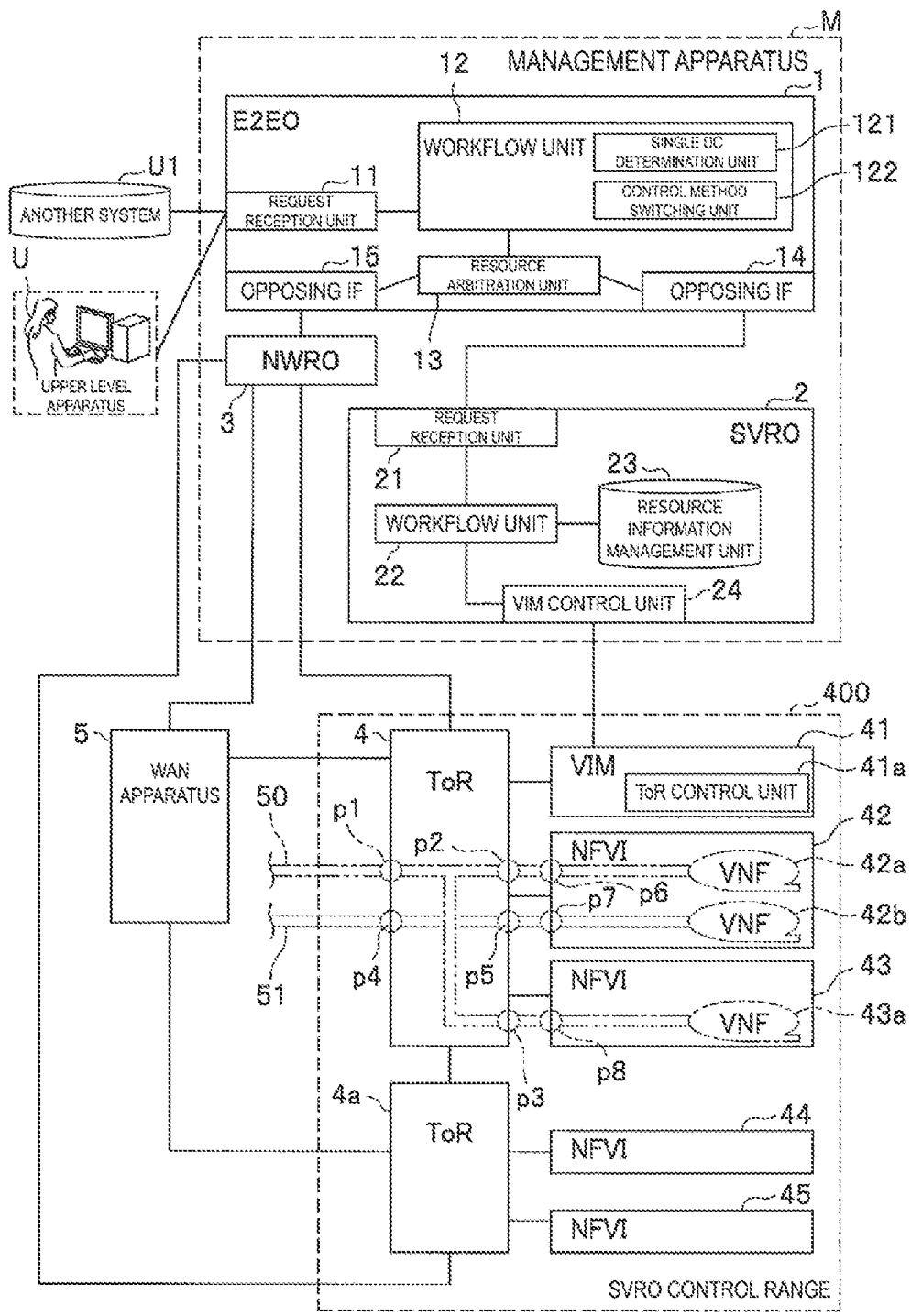
FIG. 1 is a functional configuration diagram of a system including a management apparatus according to the present embodiment.

As illustrated in FIG. 1, the management apparatus M includes an end to end orchestrator (E2EO) (E2E orchestrator) 1 (first orchestrator), a server resource orchestrator (SVRO) 2 (second orchestrator), and a network resource orchestrator (NWRO) 3 (third orchestrator).

The E2EO 1 is a functional unit that autonomously controls the NS provided to the user. The SVRO 2 is a functional unit that autonomously controls the server-type apparatuses and intra-DC apparatuses, among apparatuses located on the NW including the core NW and the access NW. The SVRO 2 can manage resources of a management target apparatus, in accordance with resource arbitration by the E2EO 1.

The NWRO 3 is a functional unit that autonomously controls the NW-type apparatuses among apparatuses located on the NW including the core NW and the access NW. The NWRO 3 can manage resources of a management target apparatus, in accordance with resource arbitration by the E2EO 1.

The E2EO 1, the SVRO 2, and the NWRO 3 operate in accordance with a request from an upper level apparatus U (external apparatus) operated by an operator or from another system U1 (external apparatus) having the identical function as the upper level apparatus U. Note that the description on the upper level apparatus U applies to the other system U1, corresponding to an operation support system (OSS) or a business support system (BSS), and thus the description on the other system U1 will be omitted unless otherwise indicated.

The server-type apparatus is an apparatus that executes the NS. The server-type apparatuses include, for example, a data center (DC), a general-purpose server located in the DC, and a virtual server, which is a virtual machine (VM), implemented by virtualizing the general-purpose server, but is not limited to these. One application (APL) can be located on the virtual server. The APL runs on the virtual server, so that a predetermined NS can be provided to the user. In the present embodiment, the APL may be referred to as a virtual network function (VNF, NW function) configured with one or more virtual network function components (VNFc, NW function component) combined.

In FIG. 1, a virtual infrastructure manager (VIM) 41, network function virtualization infrastructures (NFVIs) 42 to 45, and VNFs 42a, 42b, and 43a are illustrated as examples of the server-type apparatuses managed by the SVRO 2, but such apparatuses are not limited to these. The SVRO 2 further manages ToRs 4 and 4a.

The ToRs 4 and 4a are physical switches that are directly connected to a plurality of general-purpose servers and collectively manage the plurality of general-purpose servers. The ToR 4 is connected to the VIM 41 and the NFVIs 42 and 43. The ToR 4a is connected to the NFVIs 44 and 45. The ToRs 4 and 4a are classified as the NW-type apparatuses and are communicatively connected to the NWRO 3. Still, under a predetermined condition in the present embodiment, the ToRs 4 and 4a are not controlled by the NWRO 3 and are controlled by the SVRO 2.

Note that connection of the ToR to the NFVI means direct connection of the ToR to a physical server constituting the NFVI.

The VIM 41 is a server that manages and controls a VM generated in a general-purpose server. The VIM 41 includes a ToR control unit 41a. The ToR control unit 41a is a functional unit that executes ToR control via the VIM when control parameters from a VIM control unit 24 (described later) include ToR control information related to the ToR control.

The NFVIs 42 to 45 are virtual servers according to network functions virtualization (NFV). The NFV is a scheme of implementing the function of the NW device as software (virtual machine) on a virtualization platform of a general-purpose server. The NFVI serves as a platform for constructing the NFV. The VNF operates on the NFVI. The VNFs 42a and 42b in FIG. 1 operate on the NFVI 42, and the VNF 43a operates on the NFVI 43.

Note that the VIM and the NFVI are defined, controlled, and managed by NFV management and network orchestration (NFV MANO).

The reference signs 50 and 51 illustrated in FIG. 1 denote virtual NWs for the VNFs for providing a given service and connected to the VNFs via various ports. The VNF virtual NW 50 is connected to the VNFs 42a and 43a via a virtual network interface card (vNIC) for the VNF 42a (not illustrated) and a vNIC for the VNF 43a (not illustrated) respectively, and through ports p1 to p3 of the ToR 4, a port p6 of the NEVI 42, and a port p8 of the NFVI 43. The VNF virtual NW 51 is connected to the VNF 42b via a vNIC for the VNF 42b, and through ports p4 and p5 of the ToR 4 and a port p7 of the NFVI 42.

A reference sign 400 illustrated in FIG. 1 indicates an SVRO control range which is a control target range of the SVRO 2. The SVRO control range 400 includes the ToRs 4 and 4a, the VIM 41, the NFVIs 42 to 45, and the VNFs 42a, 42b, and 43a, that are described above, but what is included therein is not limited to these.

The ToRs 4 and 4a, the VIM 41, the NFVIs 42 to 45, and the VNFs 42a, 42b, and 43a in FIG. 1 are assumed to be intra-DC apparatuses that are located in the identical DC.

Thus, the SVRO control range 400 corresponds to a range including a group of apparatuses that are located in a single DC. The service provided by the VNF virtual NWs 50 and 51 is a service that is completed within a single DC.

The NW-type apparatus is an apparatus that transfers data, for executing the NS, to another NW-type apparatus or to a server-type apparatus. The NW-type apparatuses include, for example, an optical line terminal (OLT, optical subscriber line termination apparatus), a core router, a layer 2 switch (L2SW), a layer 3 switch (L3SW), network terminal equipment (NTE, network termination apparatus), and a WAN apparatus, but are not limited to these.

As examples of the NW-type apparatuses managed by the NWRO 3, the ToR 4 and 4a and the WAN apparatus 5 are illustrated in FIG. 1. However, such apparatuses are not limited to these. The WAN apparatus 5 is a NW-type apparatus that relays inter-DC communication. The WAN apparatus 5 is communicatively connected to the ToRs 4 and 4a. The WAN apparatus 5 is a control target of the NWRO 3.

Details of E2EO 1

The E2EO 1 includes a request reception unit 11, a workflow unit 12, a resource arbitration unit 13, and opposing IFs 14 and 15.

The request reception unit 11 acquires a NS generation request output from the upper level apparatus U. The NS generation request is information for causing the management apparatus M to generate (construct) the NS. The NS generation request includes NS information in which descriptors of a plurality of types of server-type apparatuses and descriptors of a plurality of types of NW-type apparatuses are combined while being arranged as appropriate to represent a logical path set for a given NW configuration. The E2EO 1 maps these descriptors to respective server-type and NW-type apparatuses located on the NW. The NS generation request also includes an input parameter required for designating the server-type apparatuses and the NW-type apparatuses used for providing the NS using the logical path. Note that the request output from the upper level apparatus U is not limited to the NS generation request, and is a request related to control for the NS and may further include, for example, a request for changing or deleting the NS. In the present embodiment, the request related to control for the NS output from the upper level apparatus U may be referred to as an "order". The input parameters included in the order are parameters for designating the apparatus to be controlled.

The workflow unit 12 is a functional unit that controls the entire processing of the management apparatus M. The workflow unit 12 includes functional units such as a single DC determination unit 121 and a control method switching unit 122.

The single DC determination unit 121 analyzes the order from the upper level apparatus U, and determines whether the order control target is (a group of apparatuses located in) one DC or is (a group of apparatuses located in) two or more DCs.

The control method switching unit 122 is a functional unit that switches the control method of the management apparatus M. For example, there are two types of control methods including: a control method that is a featured part of the present embodiment; and a control method described in PTL1 (strict control method of determining a strict control range on the basis of the apparatus type). However, the control methods are not limited to these. Switching between the control methods can be performed, for example, from the upper level apparatus U. However, this should not be construed in a limiting sense.

The resource arbitration unit 13 arbitrates the resource of the server-type apparatus and the resource of the NW-type apparatus. The resource arbitration unit 13 outputs the result of the arbitration to the SVRO 2 and to the NWRO 3 and instructs them to reflect the resource arbitration result.

Furthermore, the resource arbitration unit 13 can exclusively control the ToRs 4 and 4a. Specifically, the resource arbitration unit 13 performs control so that the processing of the order from the NWRO 3 for the ToRs 4 and 4a is not executed before the processing of the order from the SVRO 2 for the ToRs 4 and 4a is completed. Furthermore, the resource arbitration unit 13 performs control so that the processing of the order from the SVRO 2 for the ToRs 4 and 4a is not executed before the processing of the order from the NWRO 3 for the ToRs 4 and 4a. In this way, the resource arbitration unit 13 prevents the ToRs 4 and 4a from being controlled by the SVRO 2 and the NWRO 3 simultaneously.

The resources of the server-type apparatus include resources assigned to the server-type apparatus itself, and also include resources allocated to links connected to connection points set to the server-type apparatus. The resources of the NW-type apparatus include resources assigned to the NW-type apparatus itself, and also include resources allocated to links connected to connection points set to the NW-type apparatus. The links also include virtual links (VL). If the link connected to the connection point set to the server apparatus and the link connected to the connection point set to the NW-type apparatus are the same, the links can be used as a resource of the server-type apparatus, for example. Alternatively, they can be used as a resource of the NW-type apparatus.

The opposing IF 14 is an interface (IF) that communicatively connects the E2EO 1 and the SVRO 2 to each other. The opposing IF 14 can distribute (output) the order from the upper level apparatus U to the SVRO 2.

The opposing IF 15 is an IF that communicatively connects the E2EO 1 and the NWRO 3 to each other. The opposing IF 15 can distribute the order from the upper level apparatus U to the NWRO 3.

Note that the E2EO 1 can manage a catalog to be a template of the NS. The management apparatus M according to the present embodiment has a catalog-driven architecture for managing the NS using the catalog for example. The details of the catalog are described in PTL1, and thus a description thereof is omitted.

The E2EO 1 can also manage the life cycle of the NS, for example. The details of the lifecycle of the NS are described in PTL1, and a description thereof is omitted.

Details of SVRO 2

The SVRO 2 includes a request reception unit 21, a workflow unit 22, a resource information management unit 23, and a VIM control unit 24.

The request reception unit 21 receives the order from the upper level apparatus U via the opposing IF 14.

The workflow unit 22 is a functional unit that controls the entire processing of the SVRO 2.

The workflow unit 22 can generate a VIM control command for controlling the VIM from the order from the upper level apparatus U.

The resource information management unit 23 manages resources of each of the control targets of the workflow unit 22. In the present embodiment, the control target of the workflow unit 22 refers to the apparatuses in the SVRO control range 400 illustrated in FIG. 1. The resource information management unit 23 can provide a current resource status of the control target of the workflow unit 22.

The VIM control unit 24 converts the VIM control command generated by the workflow unit 22 into commands for each VIM to control the VIM 41.

Control on NW-Type Apparatuses in DC from SVRO

The present embodiment proposes a method (control method for one DC) in which while physical resources or virtual resources including the VIM and the NFVI defined by NFV MANO are being arbitrated, a physical switch (for example, a ToR which is an example of the NW-type apparatus) directly connected to a physical server (general-purpose server) constituting the NFVI is controlled from the SVRO. Such a method enables the service that is completed within a single DC to be controlled from the SVRO, so that no control from the NWRO is required.

To achieve the proposed method, the control targets of the SVRO 2 include not only the VIM or the NFVI as the server-type apparatuses, but also include the ToR as the NW-type apparatus that is the intra-DC apparatus. As illustrated in FIG. 1, the VIM 41, the NFVIs 42 to 45, and the ToRs 4 and 4a are included in the SVRO control range 400 corresponding to the range occupied by a single DC.

Note that, the proposed method is not applied to services targeting two or more DCs (services provided through operations of each of the groups of apparatuses located in the two or more DCs), and control in which the control from the SVRO 2 and the control from the NWRO 3 are combined is executed. Whether the service is completed within a single DC or targets two or more DCs is determined from the order obtained from the upper level apparatus.

Next, as to the control by the SVRO based on the proposed method, order processing executed by the management apparatus M will be described with reference to FIG. 2. The order processing starts when the upper level apparatus U outputs an order (first order) to the management apparatus M. The order includes ToR control information for controlling the ToRs 4 and 4a (intra-DC NW-type apparatus control information).

First of all, in the management apparatus NI, the order from the upper level apparatus U is acquired by the request reception unit 11 of the E2EO 1 (step S1). Next, in the management apparatus M, the single DC determination unit 121 of the workflow unit 12 of the E2EO 1 analyzes the acquired order is analyzed, to determine whether the control requested by the order is control targeting a single DC (step S2). Specifically, it is determined whether the group of apparatuses to be a target of control including the resource arbitration by the resource arbitration unit 13 is only a group of apparatuses located in a certain single DC.

For example, the single DC determination unit 121 can designate as the control target a server-type apparatus and a NW-type apparatus used for providing the NS, from input parameters included in the order. The catalog described in PIM can be also used to designate the server-type apparatus and the NW-type apparatus. As a result, the single DC determination unit 121 can determine whether the server-type apparatus and the NW-type apparatus designated are located in a single DC.

Note that in the management apparatus M, the resource arbitration unit 13 performs resource arbitration on the server-type apparatus and the NW-type apparatus, in response to the order acquired. As a result, when the order processing is completed, a predetermined amount of resources is assigned to the server-type apparatus and NW-type apparatus, to links connecting these apparatuses together, and to the NW (including real NWs and virtual NWs) on which these apparatuses are located.

The control targeting a single DC (Yes in step S2) means that the control target based on the order is a group of apparatuses in the SVRO control range 400 (FIG. 1), and means that the control on the ToR 4 connected to the VIM 41 is executed from the SVRO 2. Thus, in the management apparatus M, the workflow unit 12 makes the order (second order) addressed to the SVRO 2, which is to be output to the SVRO 2, include the ToR control information included in the order acquired from the upper level apparatus U and outputs this order to the SVRO 2 via the opposing IF 14 (step S3). In the case of the control targeting a single DC, the contents of the order addressed to the SVRO are the same as the contents of the order acquired from the upper level apparatus U. In the SVRO 2, when the request reception unit 21 receives the order addressed to the SVRO, the workflow unit 22 generates a VIM control command for the VIM 41. The VIM control command includes a control parameter for controlling the VIM 41. In the case of the control targeting a single DC, the workflow unit 22 makes the control parameters include the ToR control information included in the order addressed to the SVRO.

In the SVRO 2, the workflow unit 22 processes the order addressed to the SVRO by referring to the resource information management unit 23. As a result, the SVRO 2 can assign resources based on resource arbitration by the E2EO 1 to control target apparatuses, a link between apparatuses, and to the NW on which the apparatuses are located.

In the management apparatus M, the VIM control unit 24 outputs the control parameters including the ToR control information to the VIM 41 (step S4). The VIM 41 can implement the ToR control by the SVRO 2 by using the ToR control information included in the acquired control parameters.

In the management apparatus M, the workflow unit 22 of the SVRO 2 operates the VNF virtual NW serving as a virtual NW that utilizes a VNF designated by the order addressed to the SVRO, as the NW designated by the order addressed to the SVRO, that is, the NW used for providing services targeted by the order addressed to the SVRO (step S5). The operation of the VNF virtual NW indicates that the VNF virtual NW is set to be the target of the ToR control from the SVRO 2. The description is further given assuming that the SVRO 2 has operated the VNF virtual NW 50 (FIG. 1) in step S5.

In the management apparatus M, the workflow unit 22 of the SVRO 2 sets a NFVI physical port, which is a physical port of the NEVI, to the VNF virtual NW to be operated (step S6). The setting of the NFVI physical port is one of the configuration requirements of the ToR control by the SVRO 2. As the NFVI physical ports, the SVRO 2 sets the port p6 of NFVI 42 and the port p8 of NFVI 43 to the VNF virtual NW 50 (FIG. 1).

In the management apparatus M, the workflow unit 22 of the SVRO 2 executes the ToR control via the VIM by the ToR control unit 41a of the VIM 41, so that the ToR is set (step S7). The setting of the ToR indicates that, among the ToR physical ports of the ToR, a ToR physical port via which the VNF virtual NW to be operated is connected is determined. The setting of the ToR is one of the configuration requirements of the ToR control by the SVRO 2. As the ToR, physical port, the SVRO 2 sets the ports p1, p2, and p3 of the ToR 4 to the VNF virtual NW 50 (FIG. 1).

In the management apparatus M, the workflow unit 22 of the SVRO 2 operates the VNF used by the VNF virtual NW to be operated (step S8). The operation of the VNF indicates that the VNF is set to be the target of the ToR control from the SVRO 2. The operation of the VNF is one of the configuration requirements of the ToR control by the SVRO 2. The SVRO 2 operates the VNF 42a of the NFVI 42 and the VNF 43a of the NFVI 43, for the VNF virtual NW 50 (FIG. 1).

In the management apparatus M, the workflow unit 22 of the SVRO 2 connects the NF virtual NW operated in step S5 to the vNIC of the VNF operated, to connect the VNF virtual NW to the VNF (step S9). The SVRO 2 connects the VNF virtual NW 50 (FIG. 1) to the VNF 42a of the NFVI 42 and the VNF 43a of the NFVI 43.

Figure 2:
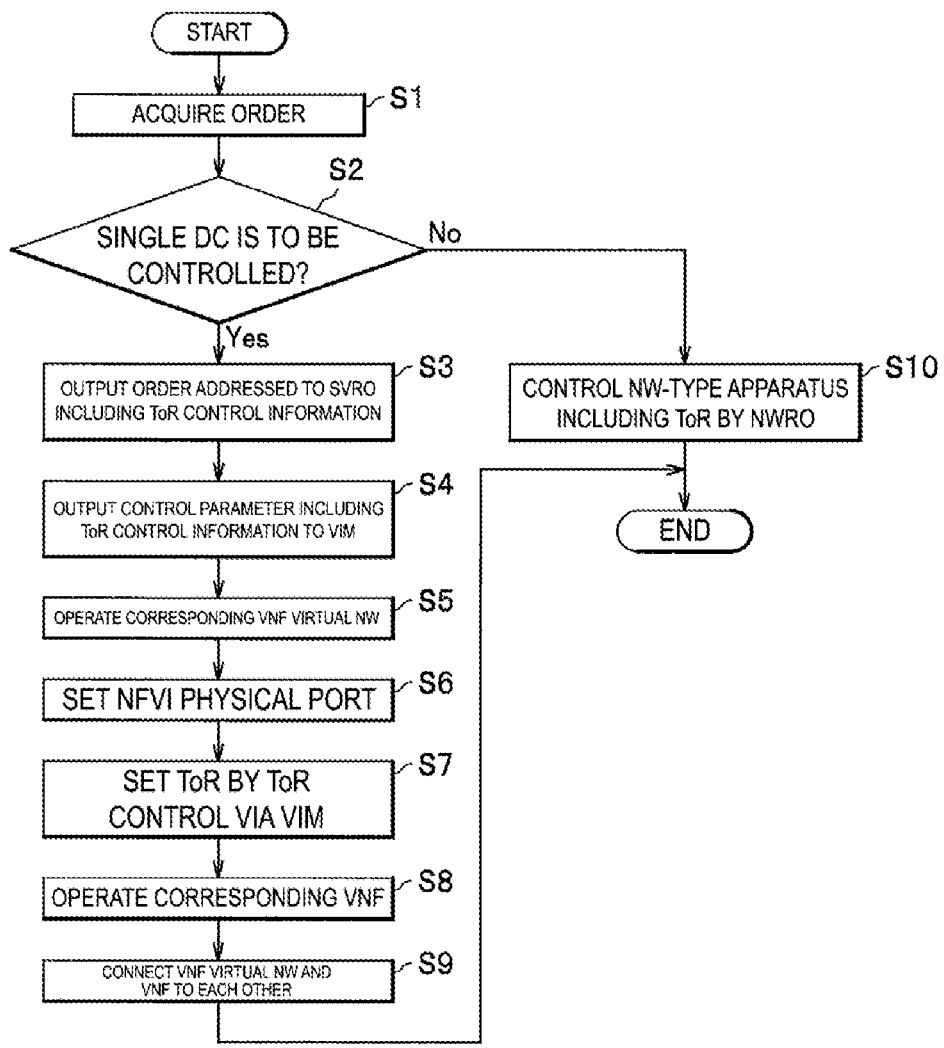
FIG. 2 is a flowchart of order processing executed by the management apparatus according to the present embodiment.

With the VNF virtual NW and the VNF connected to each other, the ToR control by SVRO 2 can be implemented, and thus the order processing in FIG. 2 ends. Thus, the ToR 4 can be controlled by the SVRO 2, not by the NWRO 3. At this time, the VIM has the ToR control information (step S4), and thus the NWRO 3 cannot control the ToR 4.

On the other hand, when the single DC determination unit 121 determines that the control requested by the order from the upper level apparatus U is not control targeting a single DC (No in step S2), it is meant that two or more DCs are to be controlled and that the NW-type apparatuses for inter-DC communication need to be controlled by the NWRO 3. In this case, the ToRs 4 and 4a, which are NW-type apparatuses, are also controlled by the NWRO 3. Thus, in the management apparatus M, the workflow unit 12 of the E2EO 1 implements the control by the NWRO 3 on the NW-type apparatuses including the ToRs (step S10), and the order processing in FIG. 2 ends. In this case, even if the ToR control information is included in the order acquired from the upper level apparatus U, the workflow unit 12 does not make the order addressed to the SVRO, which is to be output to the SVRO 2, include the ToR control information. As a result, the SVRO 2 controls the server-type apparatus only.

With the order processing in FIG. 2, the control targets of the SVRO 2 and the NWRO 3 can be limited in accordance with the determination result of the single DC determination unit 121. In particular, for a service that is completed within a single DC, the single DC is set as the control target and thus can be controlled by the SVRO 2 only.

Note that the order processing in FIG. 2 is preferably executed under the exclusive control by the resource arbitration unit 13, so that the ToRs 4 and 4a are prevented from being controlled by the SVRO 2 and the NWRO 3 simultaneously. For example, when the order addressed to the SVRO including the ToR control information is output to the SVRO 2 (step S3), the resource arbitration unit 13 outputs no further orders related to the ToRs 4 and 4a to the SVRO 2 or the NWRO 3, until the order processing in FIG. 2 is completed.

Switching of Control Method

When the ToRs 4 and 4a (FIG. 1) are controlled by the SVRO 2, the control method switching unit 122 of the workflow unit 12 of the E2EO 1 selects the method for controlling one DC described above in which the intra-DC NW-type apparatus is controlled from the SVRO 2. Furthermore, when the server-type apparatuses and the NW-type apparatuses are individually controlled in accordance with the apparatus type, the control method switching unit 122 selects the strict control method (the details of which are described in PTL1 and thus will be omitted) as the existing method for strictly determining the control ranges of the SVRO 2 and the NWRO 3. When there are further control methods available, the control method switching unit 122 can select such control methods. The selection of the control method by the control method switching unit 122 can be, for example, performed to follow commands from the upper level apparatus U, but is not limited this.

By providing the control method switching unit 122 in the workflow unit 12 of the E2EO 1, it is possible to implement flexible control over the server-type apparatuses and the NW-type apparatuses.

ToR Control for Each ToR Vendor

In view of the design of the intra-DC apparatus, multiple ToRs located in the DC may be a combination of ToRs with different specifications provided from various vendors. In such a case, when the ToR control unit 41a of the VIM 41 (FIG. 1) executes the ToR control via the VIM in accordance with the control parameter output from the VIM control unit 24 (step S4 in FIG. 2), the ToR control unit 41a may convert the ToR control information included in the control parameter into a control signal unique to each ToR vendor. This can avoid control failures due to the difference between ToR specifications of the respective vendors in the ToR control by the SVRO 2 on multiple ToRs located in the DC.

Supplement

According to the present embodiment, all of a group of apparatuses located in a single DC can be controlled from the SVRO 2, not from the NWRO 3. This may avoid conflict between SVRO 2 control and NWRO 3 control on the ToRs 4 and 4a.

Thus, the service responsiveness of the service provided by the intra-DC apparatus can be improved. In particular, the service responsiveness of a service that is completed within a single DC can be improved because a group of apparatuses used for providing the service is located in the identical DC, and thus can be controlled from the SVRO 2 only.

Others

The management apparatus M according to the present embodiment includes hardware including: an input/output unit including an interface (I/F) for input/output; a storage unit including a hard disk, a flash memory, a random access memory (RAM), and the like, and a control unit including a central processing unit (CPU). The control unit executes the above-described processing by, for example, loading a program (network management program) stored in the storage unit, onto a storage region of the storage unit, and executing the program. The management apparatus M according to the present embodiment may implement such software, and hardware cooperation.

In the present embodiment, the ToR is described as an example of the NW-type apparatus controlled by the SVRO 2, but the control target is not limited to the physical switch such as the ToR, and may be a physical switch such as an end of rack (EoR) and a middle of rack (MoR).

A technique obtained by suitably combining various techniques described in the present embodiment may be implemented.

Software described in the present embodiment may be implemented as hardware, and hardware may be implemented as software.

In addition, the hardware, the software, the flowchart, and the like can be suitably changed without departing from the spirit of the present invention.

REFERENCE SIGNS LIST

M Management apparatus
U Upper level apparatus (external apparatus)
1 E2EO (first orchestrator)
2 SVRO (second orchestrator)
3 NWRO (third orchestrator)
4, 4a ToR (physical switch)
5 WAN apparatus
121 Single DC determination unit
122 Control method switching unit
41 ToR control unit

The invention claimed is:

1. A management apparatus comprising hardware devices and software program executable thereon and configured to manage a network service (NS) constructed on a network (NW) including a core NW configured to serve as a virtualization area and an access NW configured to serve as a non-virtualization area, the management apparatus comprising:
a first orchestrator, including one or more processors and one or more memories, configured to control the NS;
a second orchestrator, including the one or more processors and the one or more memory devices configured to control server-type apparatuses located on the NW, wherein the server-type apparatuses are configured to perform the network service; and
a third orchestrator, including the one or more processors and the one or more memory devices, configured to control NW-type apparatuses located on the NW, wherein the NW-type apparatuses are configured to transfer data to one or more of the server-type apparatuses,
wherein the first orchestrator includes a determination unit, including the one or more processors and the one or more memory devices, configured to determine whether a group of apparatuses used for providing the NS is located in a single data center (DC), the group of apparatuses being designated by a first order acquired from an external apparatus and, wherein the group of apparatuses comprise one or more intra-DC NW-type apparatuses,
in response to determining that the group of apparatuses used for providing the NS is located in the single DC, the second orchestrator is configured to control the one or more intra-DC NW-type apparatuses, and
in response to determining that the group of apparatuses is not located in the single DC, the third orchestrator is configured to control the one or more intra-DC NW-type apparatuses.

2. The management apparatus according to claim 1, wherein
the first order includes control information for controlling the one or more intra-DC NW-type apparatuses, and
wherein in response to determining that the group of apparatuses is located in the single DC, the first orchestrator is configured to include the control information in a second order to be output to the second orchestrator.

3. The management apparatus according to claim 1, wherein the first orchestrator exclusively controls the one or more intra-DC NW-type apparatuses.

4. The management apparatus according to claim 1, further comprising a control method switching unit, including the one or more processors and the one or more memory devices, configured to select and switch to one of a plurality of types of control methods for controlling the group of apparatuses designated by the first order, the control method switching unit being provided in the first orchestrator.

5. The management apparatus according to claim 1, wherein the one or more intra-DC NW-type apparatuses comprise a physical switch connected to one or more server-type apparatuses located in the single DC.

6. The management apparatus according to claim 5, wherein the physical switch is a top of rack (ToR).

7. The management apparatus according to claim 6, wherein control on the ToR by the second orchestrator is unique to each vendor of the ToR by using a unique control signal generated based on specifications of the ToR.

8. A management method for a management apparatus configured to manage a network service (NS) constructed on a network (NW) including a core NW configured to serve as a virtualization area and an access NW configured to serve as a non-virtualization area, the management apparatus including a first orchestrator configured to control the NS, a second orchestrator configured to control server-type apparatuses located on the NW, wherein the server-type apparatuses are configured to perform the network service, and a third orchestrator configured to control NW-type apparatuses located on the NW, wherein the NW-type apparatuses are configured to transfer data to one or more of the server-type apparatuses, the method comprising:
- determining, by the first orchestrator, whether a group of apparatuses used for providing the NS is located in a single data center (DC), the group of apparatuses being designated by a first order acquired from an external apparatus and, wherein the group of apparatuses comprise one or more intra-DC NW-type apparatuses;
- in response to determining that the group of apparatuses used for providing the NS is located in the single DC, controlling, by the second orchestrator the one or more intra-DC NW-type apparatuses; and
- in response to determining that the group of apparatuses is not located in the single DC, controlling, by the third orchestrator, the one or more intra-DC NW-type apparatuses.

* * * * *